US00RE34367E

United States Patent [19]

Miller et al.

[11] E Patent Number: Re. 34,367

[45] Reissued Date of Patent: Sep. 7, 1993

[54] HIGH-PRESSURE-FLUID MACHINE, A SEAL

[75] Inventors: Bernard F. Miller, Corning, N.Y.; John A. Sawyer, Trout Run, Pa.; Wayne F. Wehber, Horseheads, N.Y.

[73] Assignee: Dresser-Rand Company, Corning, N.Y.

[21] Appl. No.: 859,268

[22] Filed: Mar. 25, 1992

Related U.S. Patent Documents

Reissue of:

[64] Patent No.: 4,890,542
Issued: Jan. 2, 1990
Appl. No.: 240,646
Filed: Sep. 6, 1988

U.S. Applications:

[63] Continuation of Ser. No. 653,720, Feb. 11, 1991, abandoned.

[51] Int. Cl.[5] ..... F16J 1/06

[52] U.S. Cl. ..... 92/194; 92/193; 92/201; 277/75; 277/102; 277/116; 277/73

[58] Field of Search ..... 92/51, 52, 53, 60, 60.5, 92/62, 63, 76, 81, 83, 167, 182, 193, 194, 201, 207, 247, 250; 277/72, 73, 75, 106, 116, 203, 114, 102, 98, 100

[56] References Cited

U.S. PATENT DOCUMENTS

| | | | |
|---|---|---|---|
| 1,346,652 | 7/1920 | Hinshaw et al. | 92/247 |
| 1,945,151 | 6/1931 | Marsh | 92/247 |
| 2,557,039 | 6/1951 | Stewart | 277/73 |
| 2,565,701 | 8/1951 | Stewart | 277/73 |
| 2,755,775 | 7/1956 | Flick et al. | 92/182 |
| 3,303,757 | 2/1967 | Ward | 277/75 |
| 3,549,155 | 12/1970 | Ward | 277/75 |
| 4,170,363 | 10/1979 | Bergman | 277/116 |
| 4,352,499 | 10/1982 | Foster | 277/102 |
| 4,582,329 | 4/1986 | Stalph | 277/116 |

FOREIGN PATENT DOCUMENTS

| | | | |
|---|---|---|---|
| 854611 | 9/1957 | Fed. Rep. of Germany | 92/247 |
| 3010829 | 10/1981 | Fed. Rep. of Germany | 277/102 |
| 3204553 | 8/1983 | Fed. Rep. of Germany | 277/102 |
| 621058 | 3/1927 | France | 277/116 |
| 946908 | 6/1949 | France | 277/73 |
| 1274512 | 9/1961 | France | 92/247 |
| 212136 | 9/1966 | Sweden | 277/102 |
| 788253 | 10/1957 | United Kingdom | 92/247 |

*Primary Examiner*—Thomas E. Denion
*Attorney, Agent, or Firm*—R. J. Falkowski; B. J. Murphy

[57] ABSTRACT

The seal, for use especially in non-lubricated, high-pressure, as compressors, in a one-piece, continuous sleeve which envelopes a reciprocable piston for sealing against the piston, or against the cylinder in which the piston translates. One end of the sleeve effects the sealing engagement, and the other end is spring-loaded to maintain the engagement. During operation of the compressor, or the like, it is the high-pressure gas which urges the seal into sealing engagement.

16 Claims, 2 Drawing Sheets

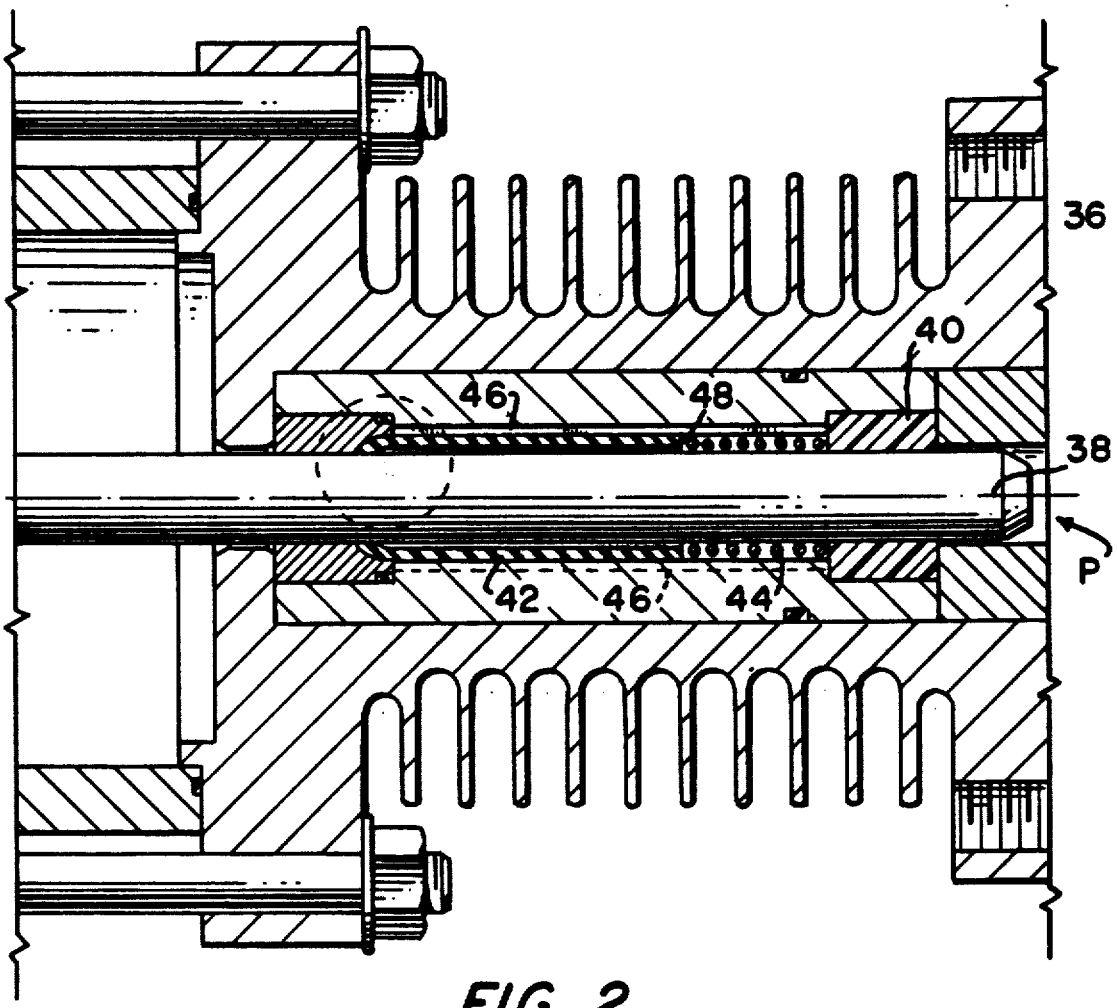
FIG. 2
FIG. 2A
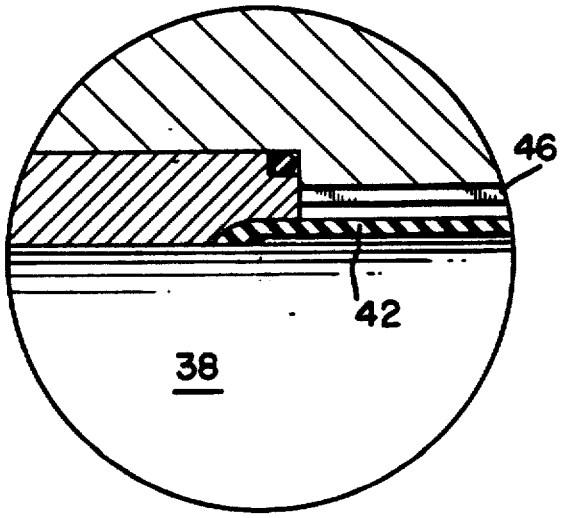

HIGH-PRESSURE-FLUID MACHINE, A SEAL

Matter enclosed in heavy brackets [ ] appears in the original patent but forms no part of this reissue specification; matter printed in italics indicates the additions made by reissue.

*This application is a continuation of application Ser. No. 07/653,720, filed Feb. 11, 1991, abandoned.*

This invention pertains to fluid seals, i.e., seals for containing fluids, and in particular to such seals for containing a high-pressure fluid, such as gas, in non-lubricated, high pressure machines, for example: non-lubricated, high pressure, gas compressors.

Compressors pumping air and other gases at pressures over 1000 psi require special seals for non lubricated serivce. One widely used seal design is a sleeve type seal (U.S. Pat. No. 3,549,155, issued to John R. Ward, on Dec. 22, 1970, for a "Helically Cut Sleeve Seal") which is made of special plastic material and is actuated by the pressure of the gas being compressed to seal. Flaring of the seal end is required before installation. Very often in many applications this seal needs re-flaring after the compressor is shutdown especially if the shutdown is for a long period. Otherwise the seal leaks and will not re-seal. To overcome this problem the seal must be energized by a mechanical means to create initial contact of the seal to the bore until pressure of compression takes over. It is an object of this invention to show that a compression spring installed behind this seal can perform that function repeatedly and extend the life of the seal. Particularly, it is an object of this invention to set forth, in a high-pressure-fluid machine, a seal, comprising a cylinder, having an inner, bore surface; and a piston, having an outer, cylindrical surface; wherein said piston is reciprocably disposed in said cylinder; a seal, interposed between said piston and said cylinder, for sealing agaisnt one of said surfaces; wherein said seal comprises one-piece, continuous sleeve, having a sealing end, and an opposite, bearing-surface end; and means confined within said cylinder, and engaged with said bearing-surface end of said seal, for urging said sealing end of said seal into sealing engagement with said one surface.

Further objects of this invention, as well as the novel features thereof, will become more apparent by reference to the following description, taken in conjunction with the accompanying figures, in which:

FIG. 2 is a cross-sectional view, like that of FIG. 1, of an alternative embodiment of the invention; and FIG. 2A is an enlargement of the detail in the circled area of FIG. 2.

Figure 1:
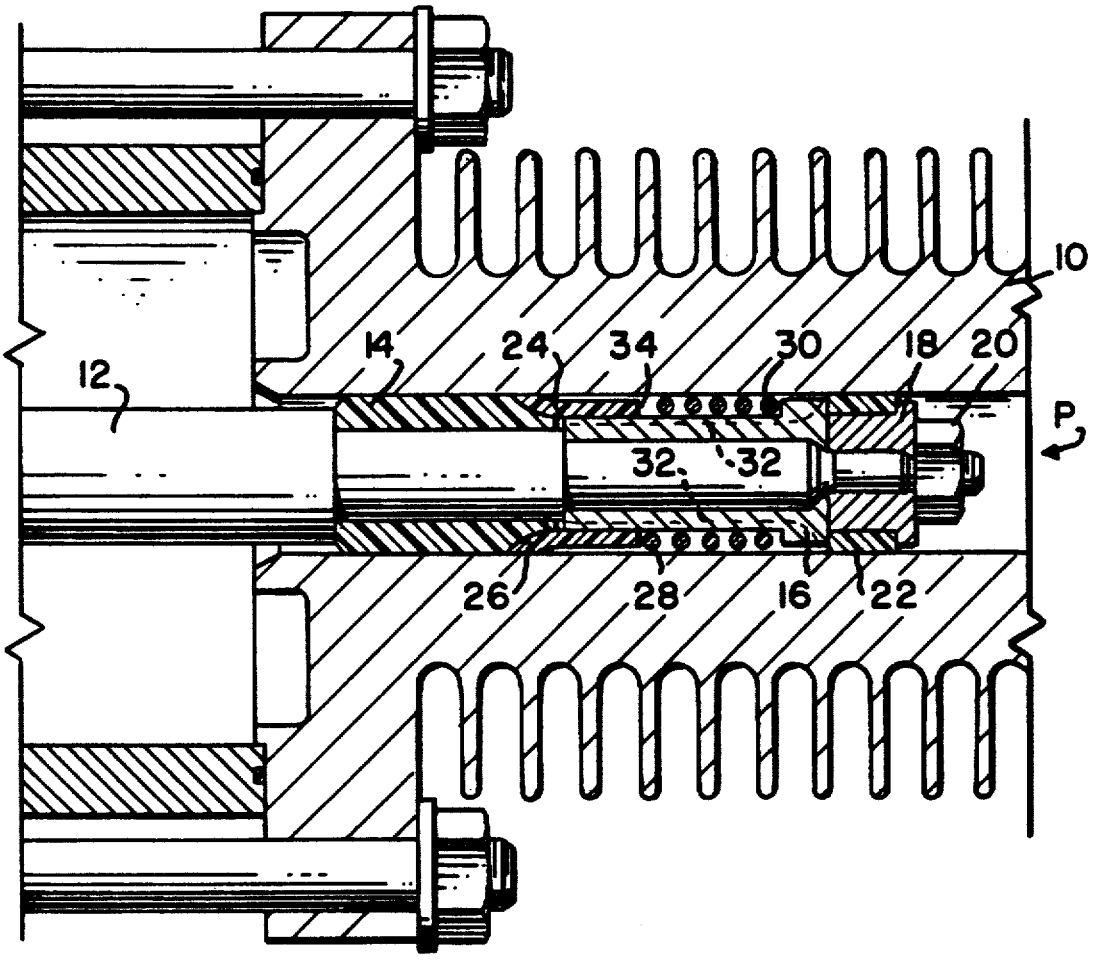
FIG. 1 is a cross-sectional view, taken along the axis of a portion of a high-pressure gas compressor, of a first embodiment of the invention.

As shown in FIG. 1, a typical cylinder 10 contains piston rod 12 which has mounted on it a floating, plastic follower 14, a steel guide 16 and spacer 18 which are clamped together by threaded nut 20. Installed on spacer 18 is a rider band 22 of plastic material. The plastic follower 14 is used to guide the sealing end of a seal 24 to seal against the cylinder bore surface when actuated by high gas pressure "P". Whilst such pressure is applied to the other, bearing surface end of the seal 24, this sealing contact is maintained over a period of time at area 26 until the seal 24 wears so short that it cannot conform. However, if this teflon seal 24 loses its memory, or if its was improperly flared initially, and the compressor is shutdown, it requires compression spring 28 to initially energize the seal 24 to make initial sealing contact prior to reaching proper pressure "P". The small spring force required, relative to the pressure "P" does not accelerate wear but rather prolongs it. Other types of energizers or types of springs can also be used, but the compression spring 28 can allow for a greater length of wear due to its overall compression length.

The spring 28 is set against a shoulder 30 formed on the steel guide 16. The guide 16 has a plurality of flutes or grooves 32, axially-extending, formed in the outer surface thereof. The same are provided to enable high pressure gas ("P") to impinge on the bearing-surface end 34 of the seal 24 to energize it (i.e., force the opposite, sealing end into sealing engagement in area 26).

Whereas, in FIG. 1 the seal 24 is carried by the piston, FIG. 2 and 2A disclose an alternative embodiment in which the seal is mounted in the cylinder.

Cylinder 36 receives a plunger-type piston 38 therein, and the latter is guided in its reciprocation by a plastic annulus 40 which is nested in the cylinder 36. The seal 42 is biased into sealing engagement with the piston 38 by a spring 44 which is set against the annulus 40. Here too, flutes or grooves 46 are formed in the bore of the cylinder to permit the high-pressure gas ("P") to address the bearing-surface end 48 of the seal 42.

While we have described our invention in connection with specific embodiments of the invention, it is to be clearly understood that this is done only by way of example, and not as a limitation to the scope of our invention, as set forth in the objects thereof, and in the appended claims

We claim:

1. In a high-pressure-fluid machine, a seal, comprising:

a cylinder, having an inner, bore surface; and a piston, having an [outer] *outermost*, cylindrical surface; wherein said piston is reciprocably disposed in said cylinder; and a seal *wholly* interposed *directly* between said [piston and said cylinder] *surfaces*, for sealing against one of said surfaces; wherein said seal comprises a one-piece, continuous sleeve;

said seal has (a) a sealing surface at only one end thereof, and (b) a bearing surface at an end thereof which is opposite said one end; and means confined within said cylinder, and engaged with said bearing surface end of said seal, for urging said one sealing end of said seal into sealing engagement with said one surface; wherein said *outermost surface of said* piston has a shoulder formed thereon;

said urging means comprises a compression spring in envelopment of said *outermost surface of said* piston; and said spring has an end thereof engaged with said shoulder.

2. The invention, according to claim 1, wherein:

said shoulder, spring, and said seal, excepting said sealing end thereof, are spaced apart from said bore surface of said cylinder.

[3. The invention, according to claim 1, wherein:

said cylinder has an annulus nested therein;

said urging means comprises a compression spring in envelopment of said piston; and said spring has an end thereof engaged with said annulus.]

4. In a high-pressure-fluid machine, a seal, comprising:

a cylinder, having an inner, *cylindrical,* bore surface; and a piston, having an [outer] *outermost,* cylindrical surface; wherein said piston is reciprocably disposed in said cylinder; and a seal *wholly* interposed *directly* between said [piston and said cylinder] *surfaces,* for sealing against one of said surfaces; wherein said seal comprises a one-piece, continuous sleeve;

said seal has (a) a sealing surface at only one end thereof, and (b) a bearing surface at an end thereof which is opposite said one end; and means confined within said cylinder, and engaged with said bearing surface end of said seal, four urging said one sealing end of said seal into sealing engagement with said one surface; wherein one of said *cylindrical* surfaces has [means] *a flute or groove* formed therein for accommodating a conduct of pressured fluid along said piston for impingement of such fluid with said bearing-surface end of said seal.

5. The invention, according to claim 4, wherein:

said urging means and said seal, excepting said sealing end thereof are spaced apart from said bore surface of said cylinder.

6. The invention, according to claim 4, wherein:

said fluid-accommodating means comprises a channel] *one cylindrical surface has a plurality of flutes or grooves* formed [in said one surface] *therein.*

7. The invention, according to claim 6, wherein:

said [outer] *outermost* cylindrical surface of said piston is said one *cylindrical* surface.

8. The invention, according to claim 6, wherein:

said inner, bore surface of said cylinder is said one *cylindrical* surface.

9. The invention, according to claim 4, further including:

an annulus, in envelopment of said piston, for guiding said piston in reciprocation.

10. The invention, according to claim 9, wherein:

said annulus is carried by said piston.

11. The invention according to claim 9, wherein:

said annulus is nested in said cylinder.

*12. For use in a high-pressure machine having (a) a cylinder with an inner, longitudinal, bore surface, and (b) a piston, reciprocable within said cylinder, with an outermost, longitudinal, cylindrical surface and an annular shoulder formed thereon, means for fluid-sealing against one of said surface, comprising:*

*a one-piece, continuous, elongate, sleeve-shaped seal for interpositioning thereof wholly and directly between said surfaces; wherein*

*said seal has a flared end which is (a) subject to having been improperly flared, and (b) susceptible to unflaring due to a loss of the flare memory thereof, said end comprising means for effecting a fluid-sealing engagement thereof with said one surface;*

*said seal further has a bearing surface at the end thereof which is opposite said flared end;*

*said opposite end comprises means responsive to pressure fluid addressed thereto for urging said flared end of said seal into the aforesaid fluid-sealing engagement thereof with said one surface; and*

*biasing means, for (a) interpositioning thereof between said opposite end of said seal and the shoulder on the piston of the machine, and (b) envelopment of said outermost surface of the piston, for applying force to said opposite end of said seal (a)* to cause said flared end to assume a proper flare and *(b)* to maintain a fluid-*sealing engagement of said flared end with said one surface, in an absence of a pressured fluid addressed to said apposite end of said seal.*

*13. Means for fluid-sealing, according to claim 12, wherein said biasing means comprise a compression spring.*

*14. For use in a high-pressure machine having (a) a cylinder with an inner, longitudinal, bore surface, and (b)* an elongate piston, reciprocable within said cylinder, with *(a) an outermost, longitudinal, cylindrical surface, (b) an annular shoulder formed thereon, and (c) a plurality of longitudinal grooves formed in the outermost cylindrical surface thereof, means for fluid-sealing against said bore surface, comprising:*

*a one-piece, continuous, elongate, sleeve-shaped seal for interpositioning thereof wholly and directly between said surfaces; wherein* said seal has a flared end which is *(a) subject to having been improperly flared, and (b) susceptible to unflaring sue to a loss of the flare memory thereof, said end comprising means for effecting fluid-sealing engagement thereof with said bore surface;*

*said seal further has a bearing surface at the end thereof which is opposite said flared end;*

*said opposite end comprises means responsive to pressured fluid addressed thereto for urging said flared end of said seal into the aforesaid fluid-sealing engagement thereof with said bore surface; and*

*biasing means, for emplacement thereof (a) circumjacent the plurality of grooves in the piston cylindrical surface, and (b) interpositionally between the shoulder on the piston and the opposite end of said seal, for applying force to said opposite end of said seal, (a) to cause said flared end to assume a proper flare, and (b) to maintain a fluid-sealing engagement of said flared end with said bore surface, in an absence of a pressure fluid addressed to said opposite end of said seal.*

*15. Means for fluid-sealing, according to claim 14, wherein:*

*said biasing means comprises a compression spring.*

*16. For use, in combination, in a high-pressure-fluid machine which has a cylinder with an inner, bore surface, piston means for reciprocable disposition thereof within said cylinder, and means mounted on said piston means for fluid-sealing against said bore surface, comprising:*

*an elongate piston having (a) an outermost, longitudinal, cylindrical surface, (b) an annular shoulder formed thereon, and (c) a plurality of longitudinal grooves formed in the outermost surface thereof, for accommodating a conduct of pressured fluid along said piston;*

*a one-piece, continuous, elongate, sleeve-shaped seal set about said piston for interpositioning thereof wholly and directly between said surfaces; wherein*

*said seal has a flared end which is (a) subject to having been improperly flared, and (b) susceptible to unflaring due to a loss of the flare memory thereof, said end comprising means for effecting a fluid-sealing engagement thereof with said bore surface;*

*said seal further has a bearing surface at the end thereof which is opposite said flared end;*

*said opposite end comprises means responsive to pressured fluid addressed thereto, via said plurality of*

*grooves, for urging said flared end of said seal into the aforesaid fluid-sealing engagement thereof with said bore surface; and*

*biasing means, disposed about said piston, and interpositionally between said shoulder of said piston and said opposite end of said seal, operative in an absence of a pressured fluid addressed to said opposite end of said seal, (a) to cause said flared end of said seal to assume a proper flare, and (b) to maintain a fluid-sealing engagement of said flared end with said bore surface.*

*17. The combination, according to claim 16, wherein: said biasing means comprises a spring.*

* * * * *